United States Patent
Warren et al.

(10) Patent No.: US 10,033,543 B2
(45) Date of Patent: Jul. 24, 2018

(54) SMART VACATION

(71) Applicant: Vivint, Inc., Provo, UT (US)

(72) Inventors: Jeremy B Warren, Draper, UT (US);
Matthew J. Eyring, Provo, UT (US);
James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/601,125

(22) Filed: May 22, 2017

(65) Prior Publication Data

US 2017/0324577 A1 Nov. 9, 2017

Related U.S. Application Data

(63) Continuation of application No. 14/677,777, filed on Apr. 2, 2015, now Pat. No. 9,660,828.

(51) Int. Cl.
| | | |
|---|---|---|
| *G08B 23/00* | (2006.01) | |
| *H04L 12/28* | (2006.01) | |
| *G08B 25/00* | (2006.01) | |
| *H04L 12/64* | (2006.01) | |
| *G08B 21/22* | (2006.01) | |
| *G08B 21/20* | (2006.01) | |

(52) U.S. Cl.
CPC ........ *H04L 12/2803* (2013.01); *G08B 25/008* (2013.01); *H04L 12/6418* (2013.01); *G08B 21/20* (2013.01); *G08B 21/22* (2013.01)

(58) Field of Classification Search
CPC ............ H04L 12/2803; H04L 12/6418; G08B 25/008; G08B 21/20; G08B 21/22
USPC ....................................... 340/573.4
See application file for complete search history.

(56) References Cited

U.S. PATENT DOCUMENTS

| | | |
|---|---|---|
| 7,124,087 B1 | 10/2006 | Rodriguez et al. |
| 8,577,392 B1 | 11/2013 | Pai et al. |
| 2011/0046805 A1 | 2/2011 | Bedros et al. |
| 2012/0190386 A1 | 7/2012 | Anderson |
| 2013/0268125 A1 | 10/2013 | Matsuoka |
| 2014/0266669 A1 | 9/2014 | Fadell et al. |

OTHER PUBLICATIONS

Robles, et al., "A Review on Security in Smart Home Development", International Journal of Advanced Science and Technology, vol. 15, Feb. 2010.

*Primary Examiner* — Tanmay Shah
(74) *Attorney, Agent, or Firm* — Holland & Hart LLP

(57) ABSTRACT

A method for security and/or automation systems is described. In some embodiments, the method may include detecting departure data relating to at least one of an occupant and a premises, identifying a likelihood of an absence in relation to the premises based at least in part on the departure data, and sending a confirmation request based at least in part on the identifying for the occupant associated with the premises to confirm the absence. In some cases, the absence may include the premises being unoccupied for at least a portion of a predetermined time period. The predetermined time period may include at least one night.

20 Claims, 7 Drawing Sheets

SMART VACATION

CROSS-REFERENCE TO RELATED APPLICATIONS

The present application is a continuation of U.S. patent application Ser. No. 14/677,777, titled: "Smart Vacation," filed on Apr. 2, 2015, and assigned to the assignee hereof. The disclosure of which is incorporated by reference herein in its entirety.

BACKGROUND

The present disclosure, for example, relates to security and/or automation systems. Security and automation systems are widely deployed to provide various types of communication and functional features such as monitoring, communication, notification, and/or others. These systems may be capable of supporting communication with a user through a communication connection or a system management action.

Automation systems may relate to features enabled at a premises and may operate when an occupant leaves a premises. In some cases an occupant may forget to perform an action related to an automation system or feature of a premises when he or she leaves the premises for a period of time, whether for portions of a day, a full day, multiple days, etc.

SUMMARY

The disclosure herein includes methods and systems for improving security and/or automation systems when an occupant leaves a premises. In some embodiments, the present systems and methods may enable the security and/or automation systems to perform one or more actions based on a determination, estimation, calculation, or other processing relating to whether the premises will be unoccupied for a predetermined time period. For example, the security and automation systems may determine a likelihood that the premises will be unoccupied for at least one night and/or a likelihood that the occupant will not return to the premises for at least one day and/or night. The system may query the occupant to confirm the absence and based at least in part on this confirmation may perform one or more additional actions. These additional actions may include, but are not limited to, arming a security system or initiating an adjustment of and/or adjusting one or more systems such as a lighting system, heating ventilation air conditioning (HVAC) system, door lock system, etc.

A method for security and/or automation systems is described. In some embodiments, the method may include detecting departure data relating to at least one of an occupant and a premises, identifying a likelihood of an absence in relation to the premises based at least in part on the departure data, and sending a confirmation request based at least in part on the identifying for the occupant associated with the premises to confirm the absence. In some cases, the absence may include the premises being unoccupied for at least a portion of a predetermined time period. The predetermined time period may include at least one night.

In some embodiments, the likelihood of the absence may be based at least in part on a current travel pattern of the occupant. The current travel pattern may include a location, a route, a direction of travel, a distance from the premises, an elapsed time since departure, or any combination thereof. In some cases, the method includes determining whether the current travel pattern matches one or more previous travel patterns associated with a previous absence and modifying the likelihood of the absence based at least in part on the determining. In some embodiments, the method may include determining whether a location of one or more other occupants of the premises relates to the current travel pattern and modifying the likelihood of the absence based at least in part on the determining. In some cases, the confirmation request may include a request for an indicator related to a length that the premises is expected to be unoccupied. In some embodiments, the method may include initiating an adjustment of and/or adjusting at least one aspect of a lighting system, or a climate control system, or a security system, or an appliance control system, or a combination thereof, based at least in part on the indicator.

In some embodiments, the method may include requesting a confirmation to schedule one or more system status updates. The one or more system status updates may permit generating a virtual key to enable entry of the premises during the absence. In some cases, the method may include automatically scheduling one or more system status updates. In one example, the method may include sending a reminder to a designated user. The reminder may relate to at least one of mail pickup, or garbage collection, or lawn care, or premises inspection, or a virtual key, or a combination thereof.

In some embodiments, the method may include checking for security irregularities relating to the premises and providing a notification based at least in part on the checking. In some embodiments, the notification is provided to at least one of the occupant and a designated user. In some embodiments, the method may include varying a schedule for powering at least one of a light, or an appliance, or a media device, or a combination thereof.

An apparatus for security and/or automation systems is also described. In some embodiments, the apparatus may include a processor, memory in electronic communication with the processor, and instructions stored in the memory, the instructions being executable by the processor to perform the steps of detecting departure data relating to at least one of an occupant and a premises, identifying a likelihood of an absence in relation to the premises based at least in part on the departure data, and sending a confirmation request based at least in part on the identifying for the occupant associated with the premises to confirm the absence. In some cases, the absence may include the premises being unoccupied for at least a portion of a predetermined time period. In some embodiments, the predetermined time period may include at least one night.

A non-transitory computer-readable medium is also described. The non-transitory computer readable medium may store computer-executable code, the code being executable by a processor to perform the steps of detecting departure data relating to at least one of an occupant and a premises, identifying a likelihood of an absence in relation to the premises based at least in part on the departure data, and sending a confirmation request based at least in part on the identifying for the occupant associated with the premises to confirm the absence. In some cases, the absence may include the premises being unoccupied for at least a portion of a predetermined time period. In some embodiments, the predetermined time period may include at least one night.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
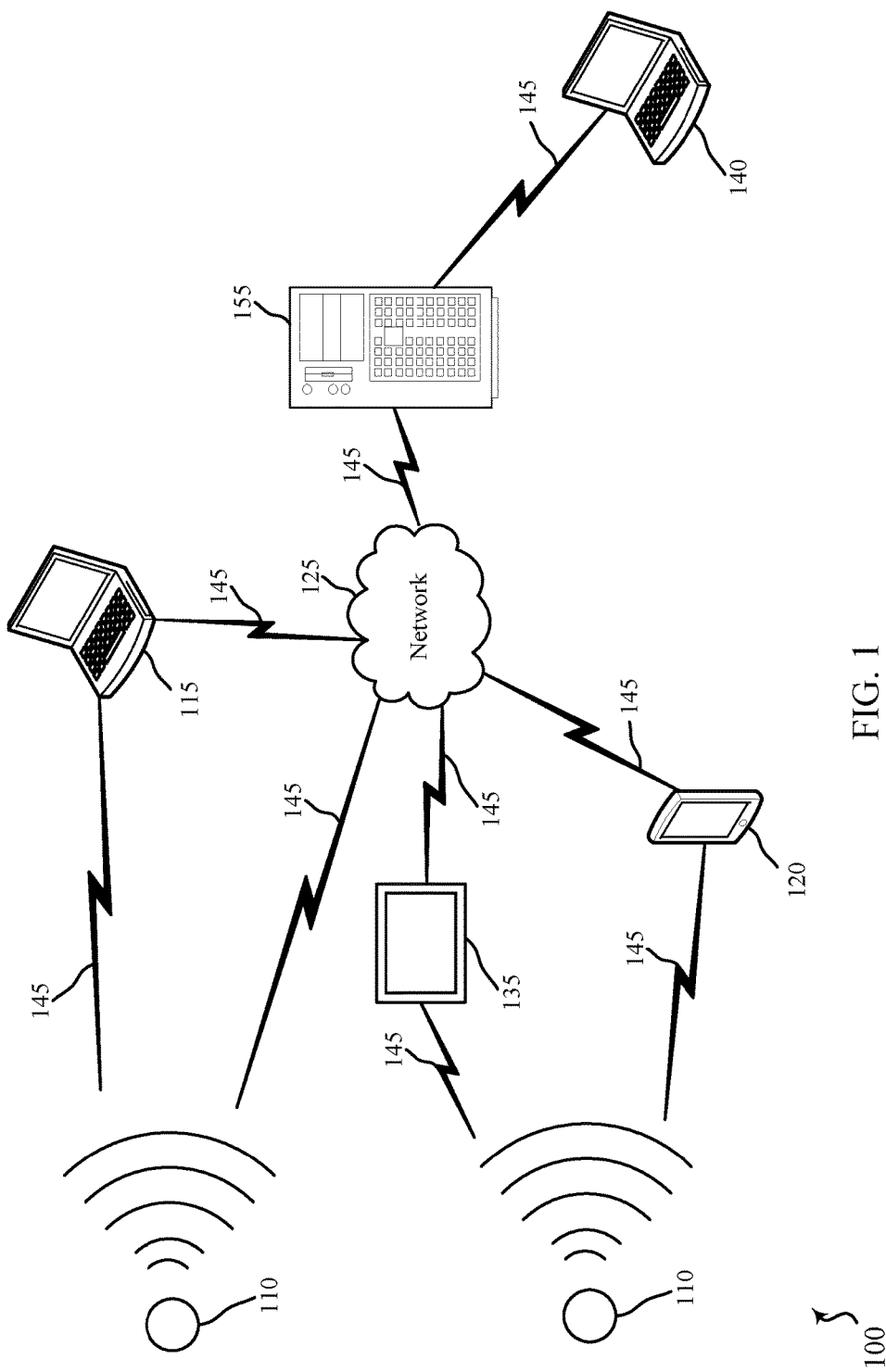
FIG. 1 is a block diagram of an example of a security and/or automation system in accordance with various embodiments.

Typically, an occupant of a premises may put a security system in an away mode when leaving. Putting the automation system in away mode, however, fails to provide any indication of when the occupant will return and/or how long the premises will be unoccupied. When the system is only put in an away mode, the system is usually only set to trigger an alarm upon detecting motion, opening doors, and/or other event triggers. In such cases, the system does not effectively manage energy use by automatically initiating an adjustment of and/or adjusting one or more systems such as a heating ventilation air conditioning (HVAC) system, a lighting system, an appliance system, etc., automatically send reminders to designated users, or automatically generate virtual keys based on a likelihood of the premises being unoccupied, etc.

The following relates generally to automation and/or security systems. Automation systems may include one or more sensors located throughout a premises. For example, sensors located in and/or outside a premises may include a location sensor, camera sensor, a motion sensor, a proximity sensor, and/or an audio sensor, among others. In some embodiments, such sensors may be used to detect occupancy. One or more sensors may be integrated with, communicate with, and/or separate from a device carried by an occupant (e.g., smartphone, sensor chip, key fob presence sensor, etc.). A premises such as a home or business may employ automation and/or security systems to automate and secure an area of the premises.

An occupant may use a mobile device to monitor a home or business. The premises may include a security system. The occupant may arm the security system when he or she leaves and disarm the security system when he or she returns. The security system may arm in the same way whether the occupant is leaving for the day or for multiple days. When the occupant leaves the premises without arming, the premises may remain unprotected.

The present systems, devices, and methods relate to premises security and occupant tracking associated with automation systems. The systems and methods may be configured to inform occupants regarding the status of a premises. For example, the systems and methods may include detecting an occupant within, around, and/or departing a premises and/or another location, and determining the likelihood that the occupant will not be returning to the premises and/or other location for a portion of a predetermined time period, such as at least one night. If the likelihood indicates the premises will be unoccupied for at least one night, the system may send a request to the occupant to confirm the occupant's absence for at least one night. In some cases, upon detecting the occupant's movements, including departing, the systems and methods may check for system irregularities in relation to the premises such as an unlocked door, an open door, an unlocked window, an open window, motion detection, an appliance being on, an appliance being off, a light being on, a light being off, the HVAC system not turning on, an ambient temperature satisfying a threshold, the HVAC system running for an unusual time (e.g., shorter or longer than usual), detecting someone at an entrance to the premises, detecting a package delivered to the premises, etc. Upon detecting an irregularity, the systems and methods may send a notification to the occupant.

The system and methods may monitor the occupant to determine whether the occupant's location, direction of travel, distance from the premises, and/or elapsed time since departure indicate a different likelihood of the occupant not returning to the premises for at least one night. For example, if the occupant travels more than 100 miles from the premises in a direction the occupant seldom travels, then the systems and methods may determine it is more likely the occupant will not be returning for the evening. As another example, if the occupant travels only 5 miles from the premises in a direction the occupant often travels, then the systems and methods may determine it is less likely the occupant will not be returning for the evening. If the occupant's location indicates the occupant is at a location relating to travel, such as an airport, a train terminal, a bus terminal, a hotel, etc., then the systems and methods may determine it is more likely the occupant will not be returning for the evening.

In some embodiments, determining that the occupant's travel pattern matches one or more aspects of a travel pattern from a previous absence may modify the likelihood of the absence. Additionally, or alternatively, determining that a location of one or more other occupants of the premises and/or other one or more other people associated with the occupant matches the occupant's location, may modify the likelihood of the absence. For example, determining a father, a mother, and/or a child are traveling in a seldom traveled direction 100 miles from the premises may increase the likelihood of an absence.

In some embodiments, if the systems and methods determine that the occupant's travel pattern indicates that the premises will be unoccupied for at least a predetermined period (e.g., a day, a night, a week, an afternoon, etc.), the systems and methods may generate a message. In some embodiments, the message may be sent to the occupant. The message may be sent via one or more available methods, including but not limited to email, text message, social media message, voice mail, in-application message, and/or the like. In some embodiments, the message may request that the occupant confirm the indicated absence. In some embodiments, the message may automatically inform the occupant of the indicated absence based on one or more actions.

In some cases, a confirmation request may ask the occupant how many nights, days, hours, weeks, and/or other measuring methods that the premises is expected to be unoccupied. In some embodiments, based at least in part on user feedback and/or automatically, the methods and/or the systems may initiate an adjustment of and/or adjust at least one aspect of a lighting system, a climate control system, a security system, an appliance control system, and/or other systems related to the premises. In some embodiments, the one or more adjustments may be based at least in part on a confirmed number of nights the premises is expected to be unoccupied.

For example, upon determining the premises will be unoccupied for only one night, the system may turn on one or more outside lights and one or more inside lights for the evening, and leave other systems, devices, and/or appliances unmodified. Upon determining the premises will be unoccupied two or more nights, the system may randomly turn lights on and off, initiate an adjustment of and/or adjust a heating ventilation air conditioning (HVAC) system based on outside temperature, inside temperature, and/or other information, turn on and off one or more media devices such as a television, radio, computing device, etc.

In some embodiments, the systems and methods may ask the occupant whether to send him or her system status updates before, during, and/or after the absence. For example, upon receiving a confirmation from the occupant that the premises will be unoccupied, the system may ask the occupant to confirm that he or she wants to receive system status updates. In some cases, the system status update may include an option to generate a virtual key. The virtual key may enable a non-occupant to interact with one or more elements related to the premises during at least a portion of the absence. The one or more elements may include a door lock, a doorbell camera unit, a window, a door, a garage door, a light, an animal area, an area of the premises, a security panel, a shed, a temporary lock, an HVAC system, an appliance, and/or other elements associated with a premises and/or an occupant of the premises. The system may send the virtual key to the designated non-occupant via one or more methods, including but not limited electronic communication methods such as text messaging, email, social media message, etc.

In some embodiments, the systems and methods may send a reminder message to a designated non-occupant. The message may be sent via text messaging, email, social media message, etc. In some cases, the reminder may include at least one of a mail pickup reminder, garbage collection reminder, lawn care reminder, premises inspection reminder. In some cases, the reminder may include a selectable option to enable the non-occupant to request a temporary virtual key to access the premises during the absence FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, and/or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an IPOD®, an IPAD®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the one or more sensor units 110 may be sensors configured to conduct periodic and/or ongoing automatic measurements related to occupancy and/or location data signals, among other things. Each sensor unit 110 may be capable of sensing multiple occupancy and/or location parameters, or alternatively, separate sensor units 110 may monitor separate occupancy and location parameters. For example, one sensor unit 110 may monitor occupancy (e.g., motion detection, image detection, voice recognition, facial recognition, proximity sensor, detect a user query, etc.), while another sensor unit 110 (or, in some embodiments, the same sensor unit 110) may detect location (e.g., global positioning system (GPS), local positioning system (LPS), relative location, etc.).

Data gathered by the one or more sensor units 110 may be communicated to local computing device 115, 120, which may be, in some embodiments, a thermostat or other wall-mounted input/output smart home display, among other things. In other embodiments, local computing device 115, 120 may be a personal computer, a tablet, a smart phone, a dedicated device, and/or other device. Where local computing device 115, 120 is a smart phone or related device, the smart phone may have a dedicated application directed to collecting audio and/or video data and calculating object detection therefrom. In some embodiments, the local computing device 115, 120 may process the data received from the one or more sensor units 110 to obtain a probability of an object within an area of a premises such as a person or object within a predetermined distance of an entrance to the premises as one example. In alternate embodiments, remote computing device 140 may process the data received from the one or more sensor units 110, via network 125 and server 155, to obtain a probability of detecting an object within the vicinity of an area of a premises, such as detecting a person at an entrance to the premises for example. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of occupancy data from a sensor unit 110, a stream of in-premises location data from the same and/or a different sensor unit 110, and/or a stream of out-of-premises location data from either the same or yet another sensor unit 110.

In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory and/or through a wired and/or a wireless connection) containing audio and/or video data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
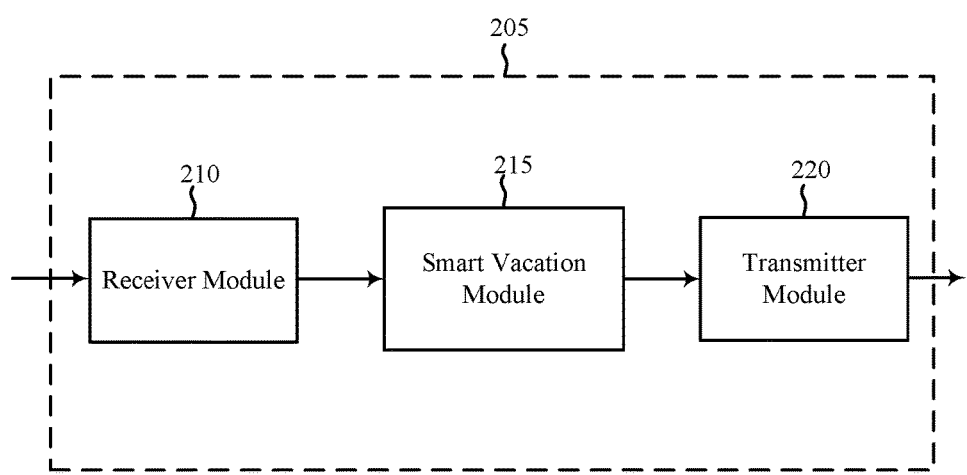
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 135 described with reference to FIG. 1. The apparatus 205 may include a receiver module 210, a smart vacation module 215, and/or a transmitter module 220. The apparatus 205 may also be or include a processor. Each of these modules may be in communication with each other and/or other modules—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive occupancy signals and/or data (e.g., proximity data, motion data, identification data, etc.) and/or location signals and/or data (e.g., GPS, LPS, direction of travel, route, distance from premises, estimated mode of travel, etc.), and/or other signals and/or data. Information may be passed on to the smart vacation module 215, and to other components of the apparatus 205.

In some embodiments, the smart vacation module 215 monitor a premises to determine a likelihood the premises will be unoccupied for a predetermined time. In some embodiments, the likelihood may include, but is not limited to, a probability, a confidence level, a threshold, a calculation, a determination, among other things. For example, upon determining an occupant is located 180 miles away from the premises and traveling away from the premises at 60 miles per hour, the smart vacation module 215 may initiate and/or perform one or more operations, such as initiating an adjustment of and/or adjusting one or more aspects of automated devices, based at least in part on the likelihood that the occupant will not be home for a period of time, such as at least three hours. Based on the estimated time period the premises will likely remain unoccupied, the smart vacation module 215 may initiate an adjustment of and/or adjust one or more components of a security and/or automation system, including, but not limited to, lights, initiate an adjustment of and/or adjust a set temperature of a thermostat at the premises, initiate an adjustment of and/or adjust the operation of an appliance (e.g., adjust an operation of a cycle of a dishwasher, clothes washer, and/or dryer, etc.). For example, the smart vacation module 215 may prolong the operation of a dryer cycle to minimize wrinkles in the items being dried. As another example, the smart vacation module 215 may delay the operation of an appliance (e.g., an oven, a coffee maker, a washer, a dryer, a water heater, a pool heater, etc.) to coincide with a calculated and/or a verified arrival time.

The transmitter module 220 may transmit the one or more signals received from other components of the apparatus 205. The transmitter module 220 may transmit occupancy signals and/or data (e.g., proximity data, motion data, identification data, etc.) and/or location signals and/or data (e.g., GPS, LPS, direction of travel, route, distance from premises, estimated mode of travel, etc.) and/or other data. In some cases, transmitter module 220 may transmit results of data analysis on occupancy and/or location signals and/or data analyzed by smart vacation module 215, among other things. In some examples, the transmitter module 220 may be collocated with the receiver module 210 in a transceiver module. In other examples, these elements may not be collocated.

Figure 3:
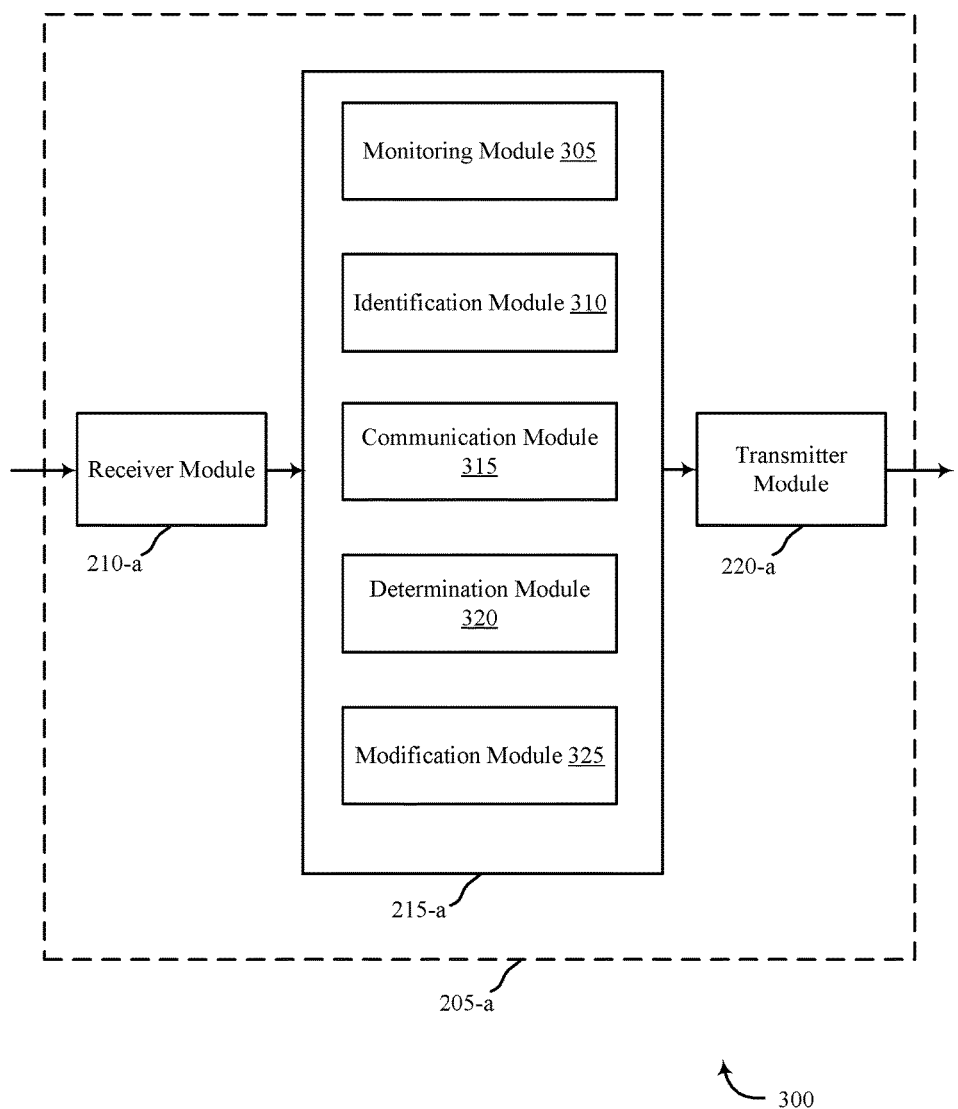
FIG. 3 shows a block diagram of a device relating to a security and/or an automation system, in accordance with various aspects of this disclosure.

FIG. 3 shows a block diagram 300 of an apparatus 205-a for use in wireless communication, in accordance with various examples. The apparatus 205-a may be an example of one or more aspects of a control panel 135 described with reference to FIG. 1. It may also be an example of an apparatus 205 described with reference to FIG. 2. The apparatus 205-a may include a receiver module 210-a, a smart vacation module 215-a, and/or a transmitter module 220-a, which may be examples of the corresponding modules of apparatus 205. The apparatus 205-a may also include a processor. Each of these components may be in communication with each other. The smart vacation module 215-a may include monitoring module 305, identification module 310, communication module 315, determination module 320, and/or modification module 325, among other things or modules. The receiver module 210-a and the transmitter module 220-a may perform the functions of the receiver module 210 and the transmitter module 220, of FIG. 2, respectively.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, monitoring module 305 may monitor a security system and/or an automation system associated with the premises. For example, in conjunction with one or more sensors, the monitoring module 305 may monitor one or more doors, windows, areas of the premises, appliances, lighting, HVAC, vehicles, etc. In some cases, monitoring module 305 may detect departure data relating to at least one of an occupant and a premises. Departure data may include data generated from one or more sensors associated with an automation system, electronic information including but not limited to emails, text message, and/or social media posts, and/or other information.

Accordingly, monitoring module 305 may operate in conjunction with one or more sensors that generate departure data indicating, relating to, confirming an occupant departure of the premises at the present time, in the future, and/or in the past. For example, a sensor may detect the occupant opening a door of the premises and walking out through the opened door. Additionally, or alternatively, the sensors may detect a location of the occupant outside the premises. Additionally, or alternatively, the sensors may detect track movement of the occupant relating to the premises and/or other locations. For example, the system may track the user's progressive movement from inside the premises, outside the premises, in a vehicle, at a store, and/or at a travel location like an airport.

One or more sensors may detect the occupant leaving the premises in a vehicle. In some embodiments, identification module 310 may identify a likelihood of an absence in relation to the premises based at least in part on the departure data. The absence may include the premises being unoccupied for at least a portion of a predetermined time period. In some cases, the predetermined time period may include at least a night. In some embodiments, the likelihood of the absence may be based at least in part on a current travel pattern of the occupant. The current travel pattern may include at least one of a location of the occupant, a route taken by the occupant, a direction the occupant is traveling, a distance the occupant has traveled from the premises, an elapsed time since the occupant departed the premises, any combination thereof, and/or other information. For example, the current travel pattern may indicate that the occupant is traveling east, is located 120 miles from the premises, the occupant is traveling on a particular interstate highway, 2 hours have elapsed since the occupant left, and/or the occupant is traveling at 60 miles per hour. In another example, the monitoring module 305 may determine the occupant is, was, and/or will be at the airport, which may indicate that occupant is, was, and/or will be away from the premises for a day or more. In some cases, communication module 315 may send a confirmation request to the occupant to confirm the absence. In some cases, communication module 315 may send a confirmation request to the occupant to confirm a past absence to validate previous determinations, identifications, calculations, and/or other operations relating to an absence. The confirmation may be sent based at least in part on identifying the likelihood of the absence.

In some embodiments, determination module 320 may determine whether the current travel pattern matches one or more previous travel patterns associated with a previous absence. In some cases, determination module 320 may estimate a mode of travel based on location, direction, speed of travel, and/or altitude, etc. For example, a GPS unit may indicate an occupant is traveling at 60 miles per hour on or along an interstate highway. Accordingly, determination module 320 may estimate that the occupant is traveling by an automobile, motorcycle, bus, taxi, train, etc. In another example, determination module 320 may determine that the occupant is traveling at 500 miles per hour over a location with minimal infrastructure (e.g., minimal roads, minimal nearby cities, etc.). Accordingly, determination module 320 may determine that occupant is traveling by air. In some embodiments, determination module 320 may modify the likelihood of the absence based at least in part on such determinations, including based at least in part on travel method where one travel method may increase or have no effect a likelihood of an absence and another travel method may decrease or have no effect on a likelihood of an absence.

For example, determination module 320 may store data associated with one or more previous absences. The stored data may include a location of the occupant away from the premises, a direction the occupant traveled, a route taken by the occupant, a distance the occupant traveled from the premises, an estimated mode of travel, an elapsed time from departure until return, an itinerary, other information, and/or any a combination thereof. In some embodiments, determination module 320 may determine whether a location of one or more other occupants of the premises relates to the current travel pattern. In an example where three occupants reside at a premises, determination module 320 may modify the likelihood of a type of absence (e.g., a prolonged absence such as one or more nights of the premises not being occupied, etc.) based at least in part on determining the occupants are traveling together such as on vacation, business, etc. Thus, two more occupants traveling to and/or arriving at an airport may modify the likelihood of the premises being unoccupied for a longer time than usual.

On the other hand, the monitoring module 305 may detect the occupant going to work, going to school, going to a shopping location such as the grocery store, department store, etc., going to an entertainment location, going to a relatively nearby residence such as that of a friend, family member, etc. Upon detecting such local travel, the determination module 320 may determine a low likelihood of the premises being unoccupied that night. In some cases, determination module 320 may learn certain characteristics related to occupant travel, including, but not limited to, places the occupant regularly visits (such as work, school, church, shops, friends, family, etc.), times the occupant visits and/or returns from such places (e.g., in the morning, in the afternoon, in the evening, etc.), the frequency of these visits in a predetermined period (such as twice a week, every Sunday), the time of year, the duration of such visits (such as a day, a week, a few hours), and/or other information.

In some embodiments, upon determining a distance traveled by the occupant satisfies a predetermined threshold, a confirmation request may be generated. For example, upon determining the occupant has traveled over 100 miles, the communication module 315 may generate and send a confirmation request. The confirmation request may be sent to the occupant and/or one or more designated recipients. The confirmation request may request that the recipient confirm the indicated absence.

In some cases, the confirmation request may include a request for an indicator related to a length that the premises is expected be unoccupied. For example, the occupant may respond with an indicator of 3 days, indicating the premises is expected to be unoccupied for 3 days. The modification module 325 may initiate an adjustment of and/or adjust at least one aspect of one or more security and/or automation system components and/or system, including, but not limited to, a lighting system, or a climate control system, or a security system, or an appliance control system, or a combination thereof, based at least in part on the indicator. In some embodiments, modification module 325 may vary a schedule for powering at least one of a light, or an appliance, or a media device, or a combination thereof. In some embodiments, modification module 325 may suspend in-premises audio alerts during the absence. For example, modification module 325 may suspend a daily morning alarm, audio notifications regarding an automation system and/or security system during the absence. In some cases, the modification module 325 may modify the operation of appliances and/or other electronic devices such as a fridge, washer, oven, water heater, furnace, air conditioner, etc. For example, the modification module 325 may turn down a water heater, may initiate an adjustment of and/or adjust an HVAC system to use less energy during the absence, and so forth. In some embodiments, modification module 325 may adjust (e.g., turn off, suspend, etc.) an automated coffee machine, turn off a water main valve, etc.

In some embodiments, the system (via smart vacation module 215 or otherwise) may perform one or more operations discussed in this disclosure automatically without receiving information from a confirmation request. For example, based on a determined likelihood of an absence the system may automatically may initiate an adjustment of and/or adjust operation of one or more security and/or automation system components and/or other systems. This automatic operation modification may occur regardless of a confirmation request.

In some embodiments, communication module 315 may request a confirmation to schedule one or more system status updates. Upon receiving an affirmative response to the confirmation request, communication module 315 may request to schedule one or more system status updates and/or automatically perform one or more status updates. In some embodiments, the system status updates may be reoccurring such as based on the confirmed number of nights the premises is expected to remain unoccupied or non-reoccurring. In some cases, the system status updates may be sent daily at a preset time such as delivered via a notification on a smartphone, via SMS, via email, etc. In some cases, a system status update may be sent upon detecting an anomaly such as an anomaly related to a security system and/or automation system. In some cases, modification module 325 may automatically schedule one or more system status updates.

In some embodiments, the occupant may select what triggers sending a system status update (e.g., generated by schedule, generated by a sensor, etc.). In some cases, the occupant may select which aspects to include in the system status updates such as security, appliances, lighting, temperature, climate, etc. A system status update may provide periodic status updates on the premises, including reporting anomalies, motion detections, sound detections, image detections, appliance operation (e.g., operation of fridge, oven, water heater, furnace, air conditioner, vehicle at the premises, etc.). In some cases, monitoring module 305 may learn normal operation of appliances, electrical systems, HVAC systems, etc., by monitoring power usage, time of day usage, operating times, etc., and thus detect abnormalities in the monitored systems.

When no anomaly is detected, communication module 315 may generate a summary status with graphic symbols indicating no abnormalities. For example, a system status update may include an overall representation (e.g., a green checkmark, a smiley face, a numerical value, a qualitative score, etc.) for all monitored systems and/or an representation for each monitored system. Additionally, or alternatively, the system status update may include a current premises indoor temperature, current thermostat settings, current state of locks, doors, and windows, and status of detections for sensors such as motion sensors. When an abnormality is detected, the communication module 315 may include a representation (e.g., a graphical symbol such as a red box with an "X" in it) displayed in relation to the system associated with the abnormality.

In some embodiments, the one or more system status updates may permit the occupant to generate a virtual key to enable another person to enter the premises during the absence. The one or more system status updates may include a selectable option to generate a virtual key to enable a non-occupant to enter the premises during the absence. For example, the system status update may include a button that enables the occupant to send a virtual key to a designated recipient. In some embodiments, communication module 315 may send a reminder related to the absence to a designated user. In some cases, the reminder relates to mail pickup, garbage collection, lawn care, premises inspection, a virtual key, other things or event, and/or any combination thereof. In some cases, the reminder may allow the recipient to request the occupant to send him or her a virtual key.

In some embodiments, monitoring module 305 may monitor for security irregularities relating to the premises. Communication module 315 may generate a notification based at least in part on the security monitoring. The notification may be provided to the occupant and/or a designated user other than the occupant. For example, when the monitoring module 305 detects a person at the front door of the premises, the communication module 315 may generate a notification indicating the visit. When the monitoring module 305 detects a package delivered to the premises, the communication module 315 may send a notification to the occupant and/or send a message to a designated recipient (e.g., a neighbor, family member, friend, coworker, etc.) to pick up and hold the package for the occupant.

Upon receiving a confirmation of the absence from the occupant, the monitoring module 305 may detect a security abnormality such as a door left unlocked, a window left open, a light left on, an appliance left on, etc. The communication module 315 may send a notification to the occupant regarding the abnormality in response to receiving the absence confirmation, propose one or more courses of action including a recommended action and/or other possibilities, and/or automatically perform one or more operations, among other things. The notification may include a button preconfigured to generate a virtual key to a designated person. The occupant may actuate a device (e.g., click a button, touch a screen, etc.) and then the communication module 315 may generate the virtual key, send the virtual key to the designated user, and/or send notifications to the occupant regarding the designated user receiving the virtual key, activating the virtual key, and/or using the virtual key.

When the monitoring module 305 detects a flood condition via a flood sensor (e.g., indoor plumbing flood, outdoor water flood, etc.), the communication module 315 may send a notification immediately to the occupant, send a notification to a designated user, and/or send a notification to a designated emergency response contact regarding the detected flood. Virtual keys may be automatically generated for the designated user and/or emergency response personnel. In some cases, the modification module 325 may automatically close an automated water main valve to stem the flooding due to potential indoor water sources. The virtual keys may include, but is not limited to, a wirelessly transmitted code, a numerical password, a key word to be entered and/or spoken, a symbol, a QR code to be scanned, a phrase, and/or other information.

Figure 4:
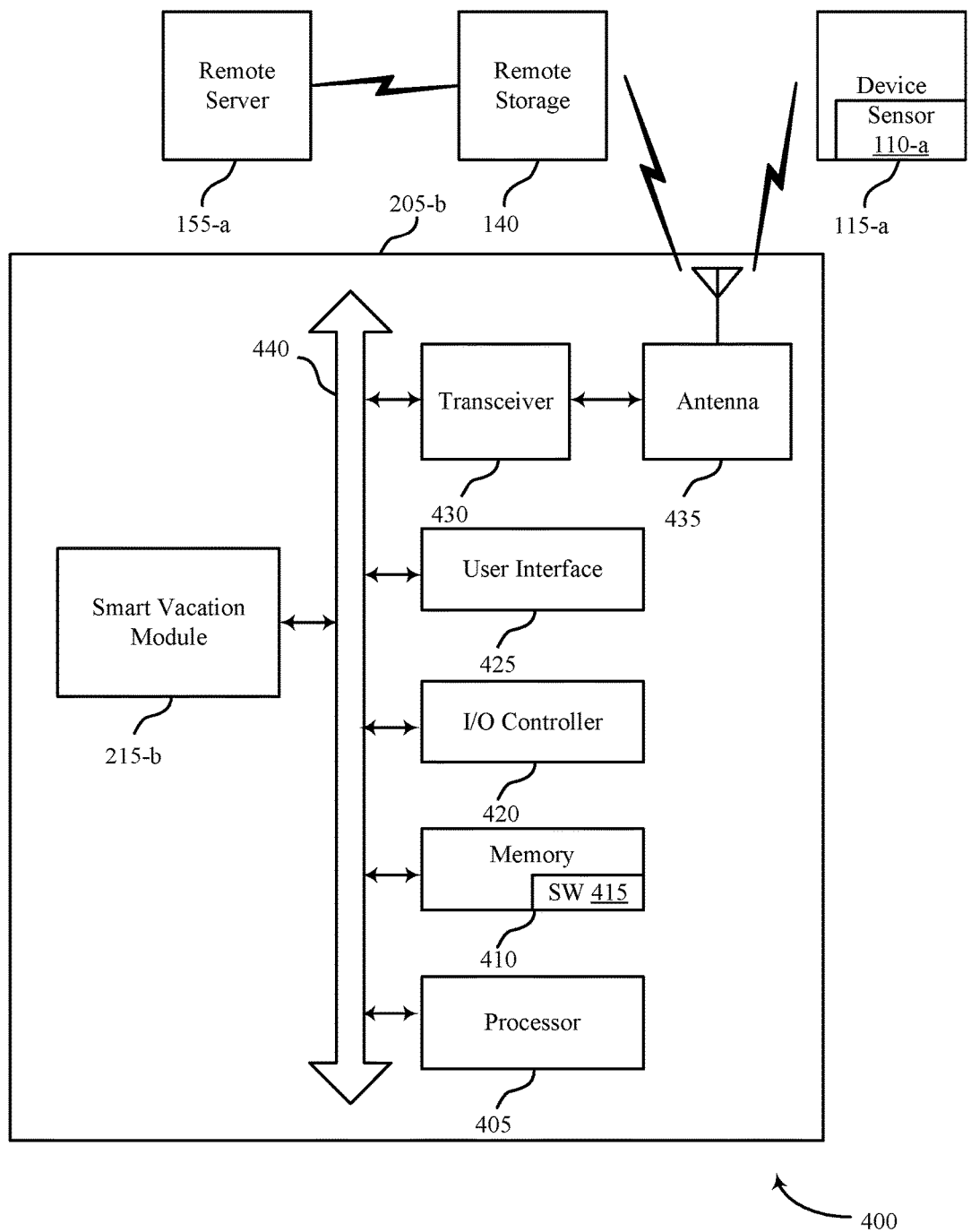
FIG. 4 shows a block diagram relating to a security and/or an automation system, in accordance with various aspects of this disclosure.

FIG. 4 shows a system 400 for use in automation systems, in accordance with various examples. System 400 may include an apparatus 205-b, which may be an example of the control panels 135 of FIG. 1. Apparatus 205-b may also be an example of one or more aspects of apparatus 205 and/or 205-a of FIGS. 2 and 3.

Apparatus 205-b may include components for bi-directional voice and data communications including components for transmitting communications and components for receiving communications. For example, apparatus 205-b may communicate bi-directionally with one or more of device 115-a, one or more sensor units 110-a, remote computing device 140, and/or remote server 155-a, which may be an example of the remote server of FIG. 1. This bi-directional communication may be direct (e.g., apparatus 205-b communicating directly with remote computing device 140) and/or indirect (e.g., apparatus 205-b communicating indirectly with remote server 155-a through remote computing device 140).

Apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote computing device 140, and/or remote server 155-*a*. The transceiver module 430 may include a modem to modulate the packets and provide the modulated packets to the one or more antennas 435 for transmission, and to demodulate packets received from the one or more antennas 435, the control panel or the control device may also have multiple antennas 435 capable of concurrently transmitting or receiving multiple wired and/or wireless transmissions.

In some embodiments, one element of apparatus 205-*b* (e.g., one or more antennas 435, transceiver module 430, etc.) may provide a direct connection to a remote server 155-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensor units 110-*a* (e.g., GPS, LPS, motion, proximity, smoke, light, glass break, door, audio, image, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., determining occupancy of a premises, tracking a location of an occupant, determining a likelihood of the premises being unoccupied for one or more nights, and/or determine whether to generate a notification, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the smart vacation module 215 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus (e.g., 205-*b*) and/or a control panel or a control device may include a single antenna 435, the apparatus (e.g., 205-*b*) and/or a control panel or control device may have multiple antennas 435 capable of concurrently transmitting and/or receiving multiple wireless transmissions.

The apparatus 205-*b* may include a smart vacation module 215-*b*, which may perform the functions described above for the smart vacation modules 215 of apparatus 205 of FIGS. 2 and 3.

Figure 5:
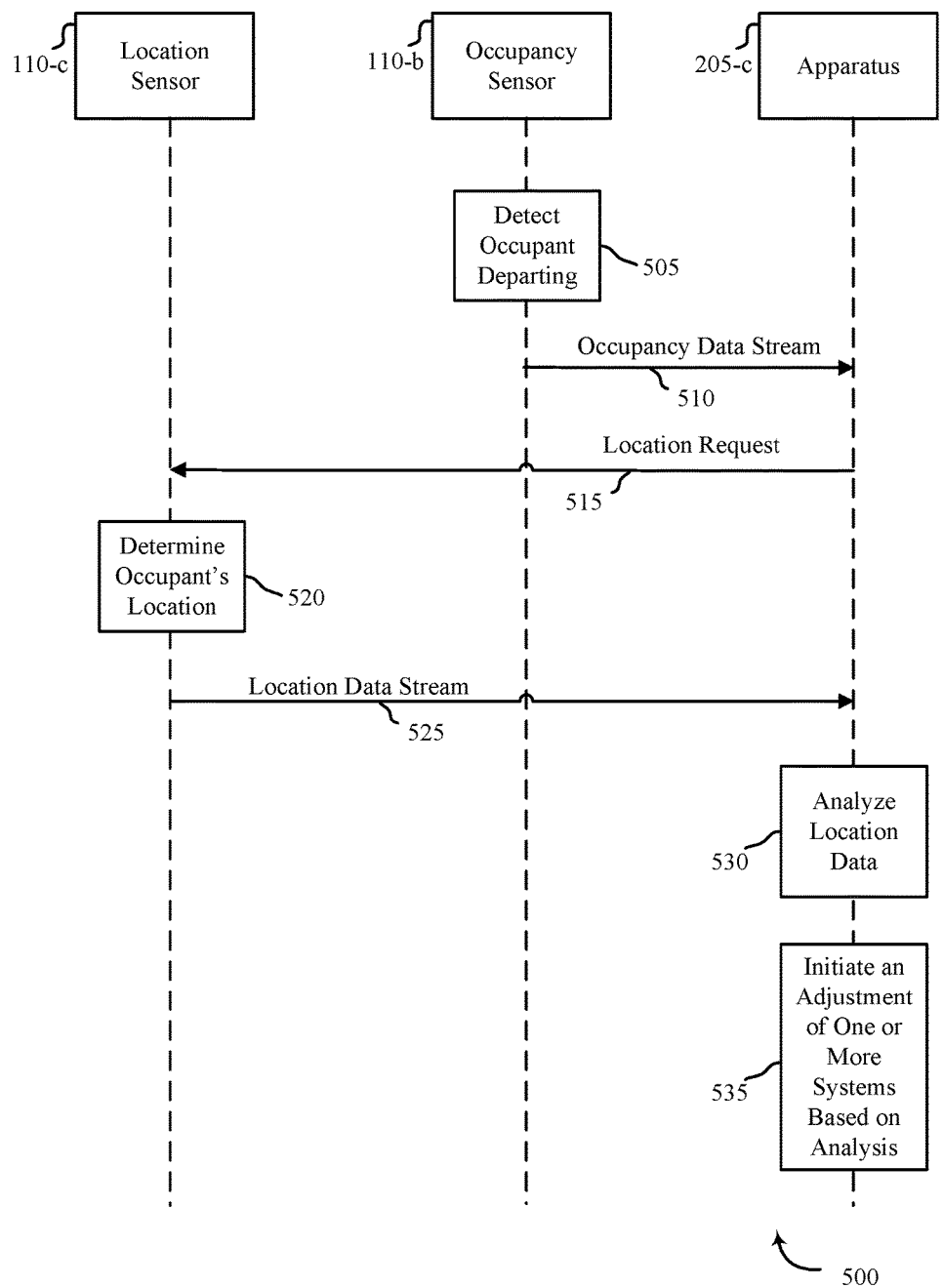
FIG. 5 shows a block diagram of a data flow relating to a security and/or an automation system, in accordance with various aspects of this disclosure.

FIG. 5 shows an exemplary block diagram of a data flow 500 relating to a security and/or an automation system, in accordance with various aspects of this disclosure. The data flow 500 illustrates possible scenarios relating to the flow of data between an occupancy sensor unit 110-*b*, a location sensor unit 110-*c*, and/or an apparatus 205-*c*. In some embodiments, the data flow 500 may include additional component and/or elements. In some embodiments, the data flow 500 may omit one or more component and/or elements. The occupancy and/or location sensor units 110 may be examples of one or more aspects of sensor unit 110 from FIGS. 1 and/or 4. Apparatus 205-*c* may be an example of one or more aspects of control panel 135 of FIG. 1, and/or apparatus 205 of FIGS. 2-4. In some cases, apparatus 205-*c* may include a computing device such as a smart phone, a desktop, a laptop, a remote server (e.g., server 155 of FIG. 1), among others. In some cases, apparatus 205-*c* may include a storage device and/or a database, among other things.

At block 505, occupancy sensor unit 110-*b* may detect an occupant departing and/or other movement. Occupancy sensor unit 110-*b* may send occupancy data stream 510 to apparatus 205-*c*. In some cases, occupancy sensor unit 110-*b* may send occupancy data stream 510 based on detecting the occupant departing. Additionally, or alternatively, occupancy sensor unit 110-*b* may send a continuous occupancy data stream 510 to apparatus 205-*c*. Upon receiving occupancy data stream 510, apparatus 205-*c* may send a location request 515 to location sensor unit 110-*c*. At block 520, the location sensor unit 110-*c* may determine one or more locations of the occupant, including one or more past locations, a current locations, and/or predicted future locations. Upon determining the one or more locations, location sensor unit 110-*c* may send a location data stream 525 to apparatus 205-*c*. In some cases, location sensor unit 110-*c* may send location data stream 525 upon determining the occupant's location. Additionally, or alternatively, location sensor 110-*c* may send a continuous location data stream 525 to apparatus 205-*c*. At block 530, apparatus 205-*c* may analyze the location data in the location data stream 525. At block 535, apparatus 205-*c* may initiate an adjustment of and/or adjust one or more systems, components, and/or elements based at least in part on the analysis. For example, apparatus 205-*c* may initiate an adjustment of and/or adjust an aspect of a lighting system, an HVAC system, a security system (e.g., actuating an automated lock, adjusting and/or activating a motion sensor, adjusting and/or activating a security camera, etc.).

The data flow 500 may relate to extended-absence detection and automation relating to automation/security systems. It should be noted that the data flow 500 is just one implementation and that the operations of the data flow may be rearranged, omitted, and/or otherwise modified such that other implementations are possible and contemplated. In some embodiments, for example, the location sensor unit 110-*c* may provide information relating to occupant departure and one or more other sensors, such as occupancy sensor unit 110-*b*, may relate to determine occupant location information. Moreover, one or more operations described as performed by or relating to one component may be performed by and/or relate to one or more other components.

Figure 6:
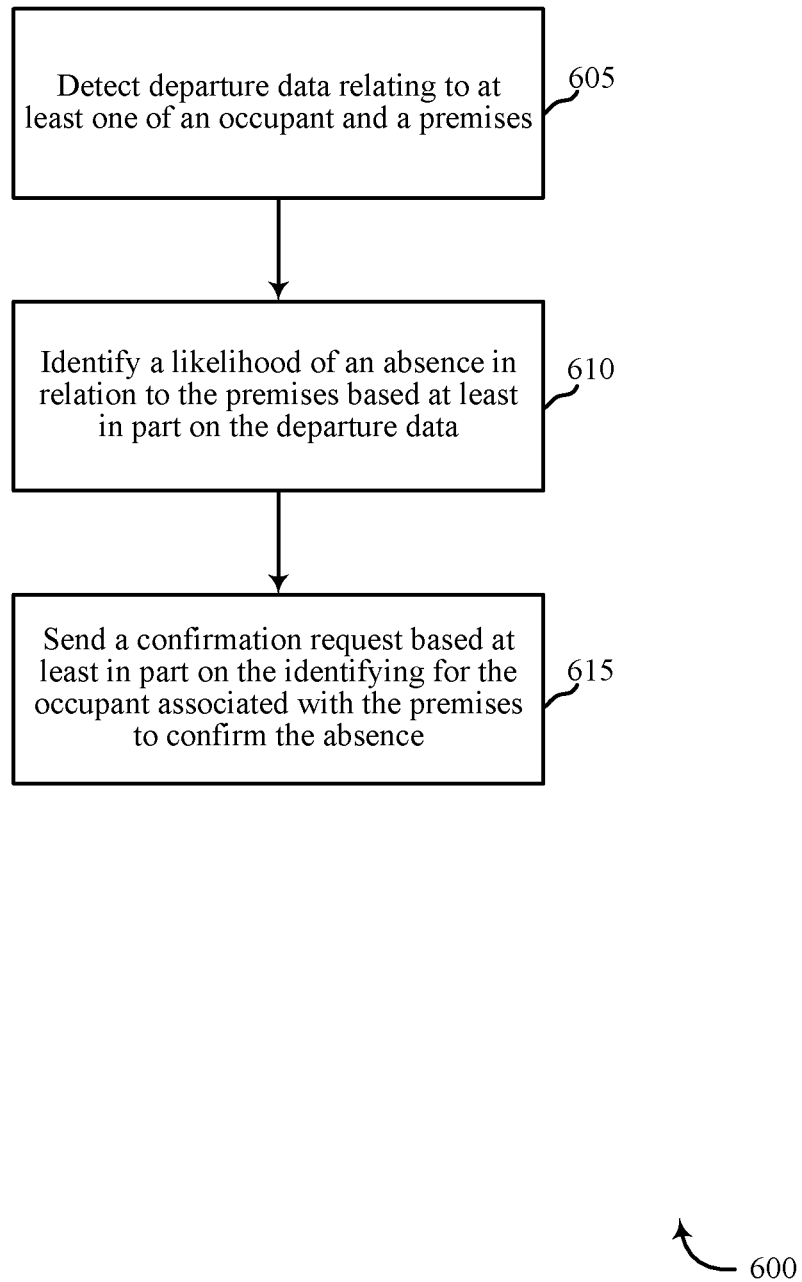
FIG. 6 is a flow chart illustrating an example of a method relating to a security and/or an automation system, in accordance with various aspects of this disclosure.

FIG. 6 is a flow chart illustrating an example of a method 600 for home automation, in accordance with various aspects of the present disclosure. For clarity, the method 600 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 605, departure data relating to at least one of an occupant and a premises may be detected. At block 610, a likelihood of an absence may be identified in relation to the premises based at least in part on the departure data. In some cases, the absence may include the premises being unoccupied for at least a portion of a predetermined time period. The predetermined time period may include at least one night. At block 615, a confirmation request may be sent based at least in part on the identifying for the occupant associated with the premises to confirm the absence. In some cases, the confirmation request may include a request for an indicator related to a length that the premises is expected be unoccupied. In some embodiments, at least one aspect of a lighting system, a climate control system, a security system, an appliance control system, or any combination thereof, may be adjusted based at least in part on the indicator provided by the occupant. In some embodiments, the likelihood of the absence may be based at least in part on a current travel pattern of the occupant. The current travel pattern may include at least one of a location, a route taken by the occupant, a direction of travel, a distance from the premises, an elapsed time since departure, or any combination thereof. Any of the operations at block 605-615 may be performed using the smart vacation module 215 described with reference to FIGS. 2-4 and/or another module.

Thus, the method 600 may provide for extended-absence detection and automation relating to automation/security systems. It should be noted that the method 600 is just one implementation and that the operations of the method 600 may be rearranged, omitted, and/or otherwise modified such that other implementations are possible and contemplated.

Figure 7:
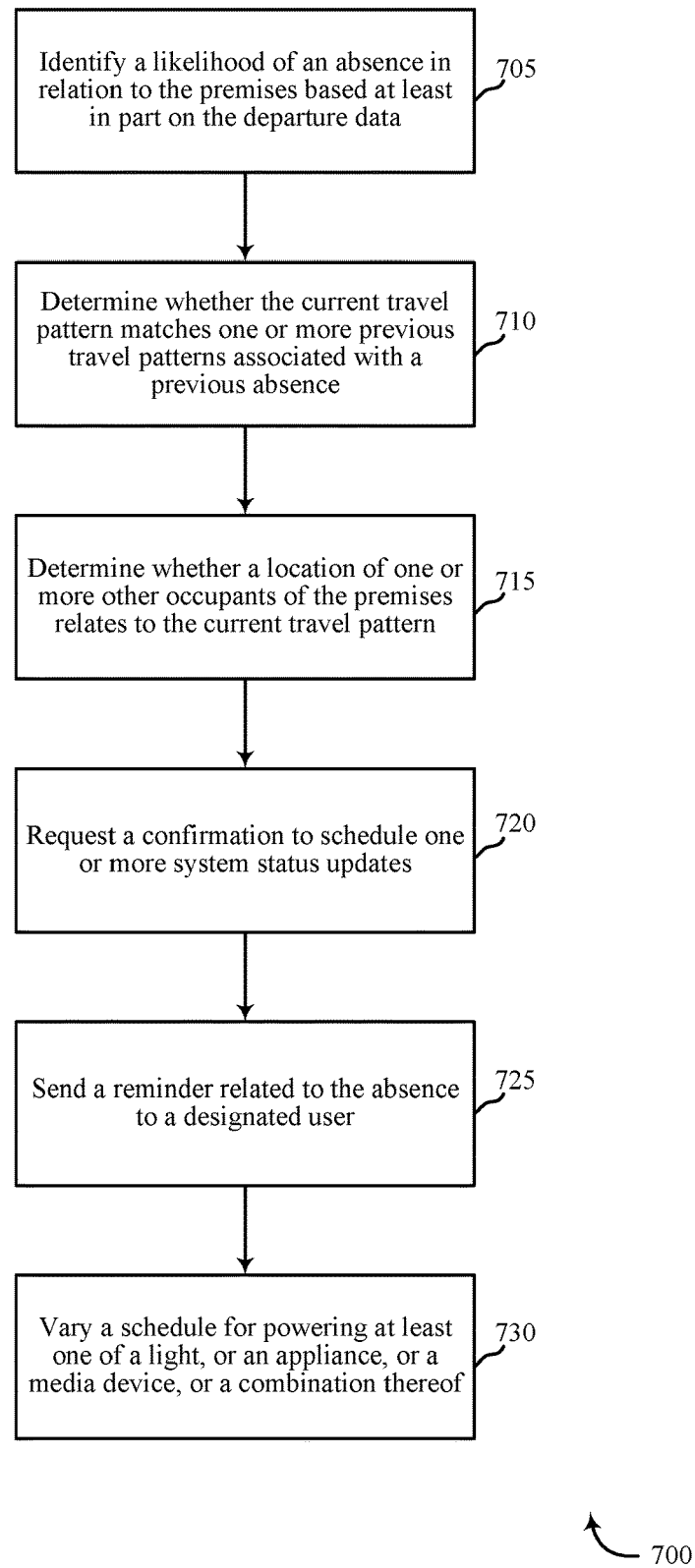
FIG. 7 is a flow chart illustrating an example of a method relating to a security and/or an automation system, in accordance with various aspects of this disclosure.

FIG. 7 is a flow chart illustrating an example of a method 700 for home automation, in accordance with various aspects of the present disclosure. For clarity, the method 700 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 705, a likelihood of an absence may be identified in relation to the premises based at least in part on the departure data. At block 710, whether the current travel pattern matches one or more previous travel patterns associated with a previous absence may be determined. At block 715, whether a location of one or more other occupants of the premises relates to the current travel pattern may be determined. The likelihood of the absence may be increased based at least in part on determining the current travel pattern matches a previous travel pattern and/or determining the location of one or more other occupants.

At block 720, a confirmation to schedule one or more system status updates may be requested. In some embodiments, one or more system status updates may be automatically scheduled. In some cases, the one or more system status updates may enable the user to request a virtual key be generated to enable entry and/or perform one or more other operations relating to the premises during the absence.

At block 725, a reminder related to the absence may be sent to a designated user such as a neighbor, family member, friend, and/or coworker. The reminder may remind the recipient regarding at least one of mail pickup, garbage collection, lawn care, premises inspection, a virtual key, other activities and/or events, and/or any combination thereof. In some cases, security irregularities relating to the premises may be monitored and a notification may be sent based at least in part on the monitoring. The notification may be provided to the occupant and/or a designated user other than the occupant.

At block 730, one or more operating parameters, such as a schedule for powering at least one of a light, an appliance, a media device, and/or any combination thereof, may be varied. In some cases, a schedule may be varied randomly to mimic the premises being occupied. In some cases, a schedule may be programmed to mimic past data related to the specific premises and/or a pre-determined schedule. The operations at blocks 705-730 may be performed using the smart vacation module 215 described with reference to FIGS. 2-4 and/or another module.

Thus, the method 700 may provide for extended-absence detection and automation relating to automation/security systems. It should be noted that the method 700 is just one implementation and that the operations of the method 700 may be rearranged, omitted, and/or otherwise modified such that other implementations are possible and contemplated.

In some examples, aspects from any of the methods 600 and 700 may be combined, separated, omitted, modified, reordered, and/or otherwise differentiated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for managing energy consumption, comprising:
    detecting departure data and a corresponding current travel pattern of at least one occupant relative to a premises;
    identifying a likelihood of an absence in relation to the premises based at least in part on the departure data and the current travel pattern, the absence comprising the premises being unoccupied for at least a portion of a predetermined time period;
    determining whether a location of one or more alternative occupants of the premises relates to the current travel pattern;
    comparing the current travel pattern to stored data associated with at least one of one or more prior absence instances or learned travel characteristics;
    modifying the likelihood of the absence based at least in part on the determining and the comparing; and
    initiating, automatically, adjustment to at least one aspect of an automation system of the premises based at least in part on the likelihood of the absence, wherein the adjustment corresponds to an operation for managing energy consumption.

2. The method of claim 1, wherein detecting the departure data further comprises:
    detecting a location of the at least one occupant of the premises;
    determining a spatial and temporal proximity of the at least one occupant to a geolocation of the premises; and
    determining a status of the at least one occupant, the status comprising at least an acknowledgement that the at least one occupant is active and traveling.

3. The method of claim 2, wherein the current travel pattern is based at least in part on the detecting, the determining of the proximity of the at least one occupant, and the determining of the status of the at least one occupant, or any combination thereof.

4. The method of claim 1, wherein the current travel pattern is based at least in part on an indication a location is outside a geolocation of the premises, a route away from the premises, a direction of travel away from the premises, an elapsed time since departure, or any combination thereof.

5. The method of claim 1, wherein comparing the current travel pattern further comprises:
    determining whether the current travel pattern matches one or more previous travel patterns associated with a previous absence; and
    modifying the likelihood of the absence based at least in part on the determining.

6. The method of claim 1, further comprising:
    sending a confirmation request to the at least one occupant, the one or more alternative occupants, or both, wherein the confirmation request comprises a request for an indicator related to a length that the premises is expected to be unoccupied.

7. The method of claim 6, further comprising:
    receiving feedback from the at least one occupant of the premises, the feedback associated with the indicator;
    determining the length the premises is expected to be unoccupied based at least in part on the feedback; and
    initiating, based at least in part on the determining, an adjustment of at least one aspect of a lighting system, a climate control system, a security system, an appliance control system, or any combination thereof.

8. The method of claim 1, further comprising:
    requesting a confirmation to schedule one or more system status updates, wherein the one or more system status updates permit generating a virtual key for a designated user to enable entry of the designated user at a barrier and/or entry of the premises during the absence.

9. The method of claim 1, further comprising:
    checking for security irregularities relating to the premises; and
    providing a notification based at least in part on the checking, wherein the notification is provided to at least one of the at least one occupant and a designated user.

10. The method of claim 1, wherein the confirmation request comprises a request for the at least one occupant to confirm a past absence, the confirmation validating at least in part previous determinations, identifications, calculations, and other operations relating to the absence, or any combination thereof.

11. The method of claim 1, wherein the likelihood includes at least one of a probability, a confidence level, a threshold, a calculation, and a determination, or any combination thereof.

12. The method of claim 1, further comprising:
    varying a schedule for powering one or more components of the at least one aspect of the automation system, wherein the one or more components comprise at least one of a light, an appliance, a media device, or any combination thereof.

13. The method of claim 1, wherein adjustment to at least one aspect of the automation system of the premises comprises a suspension to active power at one or more components of the at least one aspect, an initialization of active power at the one or more components of the at least one aspect, continuous adjustment to an active power state of the one or more components of the at least one aspect, configuration of an operable delay to the one or more components of the at least one aspect, or a combination therein.

14. The method of claim 1, further comprising:
storing, at a configured memory of the automation system, data associated with at least one of one or more prior absence instances or learned travel characteristics, wherein the data corresponds to the at least one occupant, the one or more alternative occupants, or a combination therein.

15. An apparatus for an automation system, comprising:
a processor;
memory in electronic communication with the processor; and instructions stored in the memory, the instructions being executable by the processor to:
detect departure data and a corresponding current travel pattern of at least one occupant relative to a premises;
identify a likelihood of an absence in relation to the premises based at least in part on the departure data and the current travel pattern, the absence comprising the premises being unoccupied for at least a portion of a predetermined time period;
determine whether a location of one or more alternative occupants of the premises relates to the current travel pattern;
compare the current travel pattern to stored data associated with at least one of one or more prior absence instances or learned travel characteristics;
modify the likelihood of the absence based at least in part on the determining and the comparing; and
initiate, automatically, adjustment to at least one aspect of the automation system of the premises based at least in part on the likelihood of the absence, wherein the adjustment corresponds to an operation for managing energy consumption.

16. The apparatus of claim 15, the instructions being executable by the processor to detect the departure data are further executable by the processor to:
detect a location of the at least one occupant of the premises;
determine a spatial and temporal proximity of the at least one occupant to a geolocation of the premises; and
determine a status of the at least one occupant, the status comprising at least an acknowledgment that the at least one occupant is active and traveling.

17. The apparatus of claim 16, the instructions being executable by the processor to compare the current travel pattern are further executable by the processor to:
determine whether the current travel pattern matches one or more previous travel patterns associated with a previous absence; and
modify the likelihood of the absence based at least in part on the determining.

18. The apparatus of claim 15, the instructions being executable by the processor to:
receive feedback from the at least one occupant of the premises, the feedback associated with an indicator of the confirmation request;
determine the length the premises is expected to be unoccupied based at least in part on the feedback; and
initiate, based at least in part on the determining, an adjustment of at least one aspect of a lighting system, a climate control system, a security system, an appliance control system, or any combination thereof.

19. The apparatus of claim 15, the instructions being executable by the processor to:
check for security irregularities relating to the premises; and
provide a notification based at least in part on the checking, wherein the notification is provided to at least one of the at least one occupant and a designated user.

20. A non-transitory computer-readable medium storing computer executable code for an automation system, the code executable by the processor to:
detect departure data and a corresponding current travel pattern of at least one occupant relative to a premises;
identify a likelihood of an absence in relation to the premises based at least in part on the departure data and the current travel pattern, the absence comprising the premises being unoccupied for at least a portion of a predetermined time period;
determine whether a location of one or more alternative occupants of the premises relates to the current travel pattern;
compare the current travel pattern to stored data associated with at least one of one or more prior absence instances or learned travel characteristics;
modify the likelihood of the absence based at least in part on the determining and the comparing; and
initiate, automatically, adjustment to at least one aspect of the automation system of the premises based at least in part on the likelihood of the absence, wherein the adjustment corresponds to an operation for managing energy consumption.

* * * * *